US010296923B2

(12) United States Patent
Rodriguez et al.

(10) Patent No.: US 10,296,923 B2
(45) Date of Patent: May 21, 2019

(54) TECHNIQUES FOR REAL-TIME OFFER EVALUATIONS

(75) Inventors: Laurie Ann Rodriguez, Lawrenceville, GA (US); George Mark McGregor, Pine Village, IN (US); Vincent Robert Koser, West Lafayette, IN (US); Norman Perkins Blake, Zionsville, IN (US)

(73) Assignee: NCR Corporation, Atlanta, GA (US)

( * ) Notice: Subject to any disclaimer, the term of this patent is extended or adjusted under 35 U.S.C. 154(b) by 1354 days.

(21) Appl. No.: 13/334,269

(22) Filed: Dec. 22, 2011

(65) Prior Publication Data

US 2013/0166388 A1    Jun. 27, 2013

(51) Int. Cl.
*G06Q 30/00* (2012.01)
*G06Q 30/02* (2012.01)

(52) U.S. Cl.
CPC ..... *G06Q 30/0201* (2013.01); *G06Q 30/0207* (2013.01)

(58) Field of Classification Search
CPC .. G06Q 20/322; G06Q 20/20; G06Q 30/0251; G06Q 30/0269; G06Q 30/0226; G06Q 30/0222; G06Q 30/0207; G06Q 30/0233; G06Q 30/0267; G06Q 30/0238

USPC ......... 705/14.53, 14.23, 14.27, 14.33, 14.49, 705/14.58, 14.51, 14.64
See application file for complete search history.

(56) References Cited

U.S. PATENT DOCUMENTS

| | | | |
|---|---|---|---|
| 2002/0038342 A1* | 3/2002 | Ito | G06Q 30/02 709/203 |
| 2009/0254416 A1* | 10/2009 | Nomula | G06Q 30/02 705/14.52 |
| 2012/0010931 A1* | 1/2012 | Mehra et al. | 705/14.16 |
| 2012/0101881 A1* | 4/2012 | Taylor et al. | 705/14.13 |
| 2012/0130819 A1* | 5/2012 | Willcock | G06F 17/30867 705/14.66 |
| 2012/0203604 A1* | 8/2012 | Baker et al. | 705/14.17 |
| 2013/0054338 A1* | 2/2013 | Merz | 705/14.27 |
| 2013/0073363 A1* | 3/2013 | Boal | 705/14.23 |
| 2013/0151349 A1* | 6/2013 | Patel | G06Q 20/108 705/14.67 |

* cited by examiner

*Primary Examiner* — Alvin L Brown
(74) *Attorney, Agent, or Firm* — Schwegman, Lundberg & Woessner

(57) ABSTRACT

Techniques for real-time offer evaluations are presented. An enterprise system detects and interaction with a customer. Metrics for the interaction are acquired and a centralized preference server delivers real time preference values known for the customer. The metrics and the preference values are used to dynamically and in real-time evaluate conditions for an enterprise offer and when met the offer is delivered to the customer in real time.

14 Claims, 3 Drawing Sheets

TECHNIQUES FOR REAL-TIME OFFER EVALUATIONS

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention. Individuals also perform transactions online and are capable of using their smart phones to check out of stores.

Consequently, information about a specific consumer and that consumer's preferences and habits are becoming harder and harder to ascertain. Recently, advancements have permitted a centralized consumer preference database. This allows preferences of any particular consumer to be captured from a variety of channels (in-person communication, cell communication, web communication, in-store communication, home phone communication, kiosk communication, and the like). Such advancement is significant because preferences of a consumer on one communication channel may different with that of another communication channel.

However, this centralized enterprise preference system is still not automatically tied or integrated with specific enterprise loyalty systems. This means that an entire 360 degree view of a consumer is not being captured and processed in a timely fashion when a specific consumer interacts with a specific enterprise and its loyalty applications.

As a result and for the most part, retailers providing consumer products and services currently rely on historical data from systems, such as: Customer Relationship Management (CRM), survey and transaction history to create and build offers and discounts to their consumers. These retailers presently need a means of capturing a "true voice" of customer and preference information across multiple channel/portals and being able to create those offers and discounts in real time. Further, enterprises need to be able leverage existing segmentation from their loyalty system and the centralized preference information together to create targeted offers in a real-time manner.

In particular, retailers typically interact with a large number of historical data systems and rely on customer research to create the conditions and logic to determine what triggers an offer, discount or promotion that is then provided to consumers. Retailers have not had a way for preference information from the consumer channels to feed into the loyalty system in real time such that the information is immediately usable as conditions for dynamic evaluation of offers, promotions and/or discounts.

SUMMARY

In various embodiments, techniques for real-time offer evaluations are presented. According to an embodiment, a method for real-time offer evaluation is discussed.

Specifically, a customer is identified as engaging in an interaction with the device. Offer rules pertinent to the customer are obtained from a loyalty database. Next, a preference distributer is dynamically and in real time consulted for purposes of acquiring preferences for the customer. Finally, the rules are evaluated using the preferences to determine whether an offer is to be given to the customer before the interaction with the customer concludes with the device.

DETAILED DESCRIPTION

The aforementioned industry problems are resolved by integrating enterprise preference data into enterprise point-of-sale loyalty evaluations systems, such that conditions used for making offers to a consumer interacting with an enterprise can be achieved in real time by using preference data for the consumer in the conditions evaluated by an enterprise's loyalty system to evaluate what if any offer is to be made to the consumer.

It is noted that as used herein "offer" is to include such things as, coupons, loyalty points, reward certificates, discounts, and the like.

Moreover, the techniques herein integrate in real time an enterprise preference manager (EPM) system with enterprise loyalty systems (CRM systems) at a point of contact with a customer and over any type of communication channel that utilizes the CRM systems. An example EPM system is entitled: "Centralized user Preference Management for Electronic Decision Making Devices," filed on Oct. 29, 2010 as U.S. patent Ser. No. 12/915,235, commonly assigned to NCR, Inc. of Duluth, Ga., and the disclosure of which is incorporated by reference herein and below.

As will be demonstrated more completely herein and below, a retailer uses an EPM to create dynamic user preferences and make them available to multiple channels, of which loyalty is one of the channels; that is, the loyalty or CRM system of an enterprise is one channel that the EPM communicates with. The preferences are delivered real-time to the channels (including the loyalty system) through an Application Programming Interface (API) web service, direct database connection or other like mechanisms.

A loyalty system's offer builder uses the preference definition (data type, allowed range of values, etc,) from the EPM as part of the criteria to create a set of rules that becomes a condition of earning an offer.

An enterprise loyalty system's promotion engine receives an offer definition from various mechanisms: i.e. from its CRM system via a web service or the loyalty system's offer builder. A consumer scans his loyalty card or otherwise identifies himself at a channel. The promotion engine ensures that a customer record exists, or creates a new customer record if necessary, and makes sure that all of the consumer's preferences, points and offer history are available to immediately execute offers for that customer. If a customer record is not pre-existing one may be created with a default set of preference values. The promotion engine brings items to together with preferences and evaluates the offer conditions against the preference values for those given preferences and the given consumer in order to make the decision as to whether the criteria of an offer definition have been met. When all conditions of an offer are met, a reward is issued to the consumer via the specified channel.

It is within this initial context that various embodiments of the invention are now presented and discussed below with reference to the FIGS. 1-3.

Figure 1:
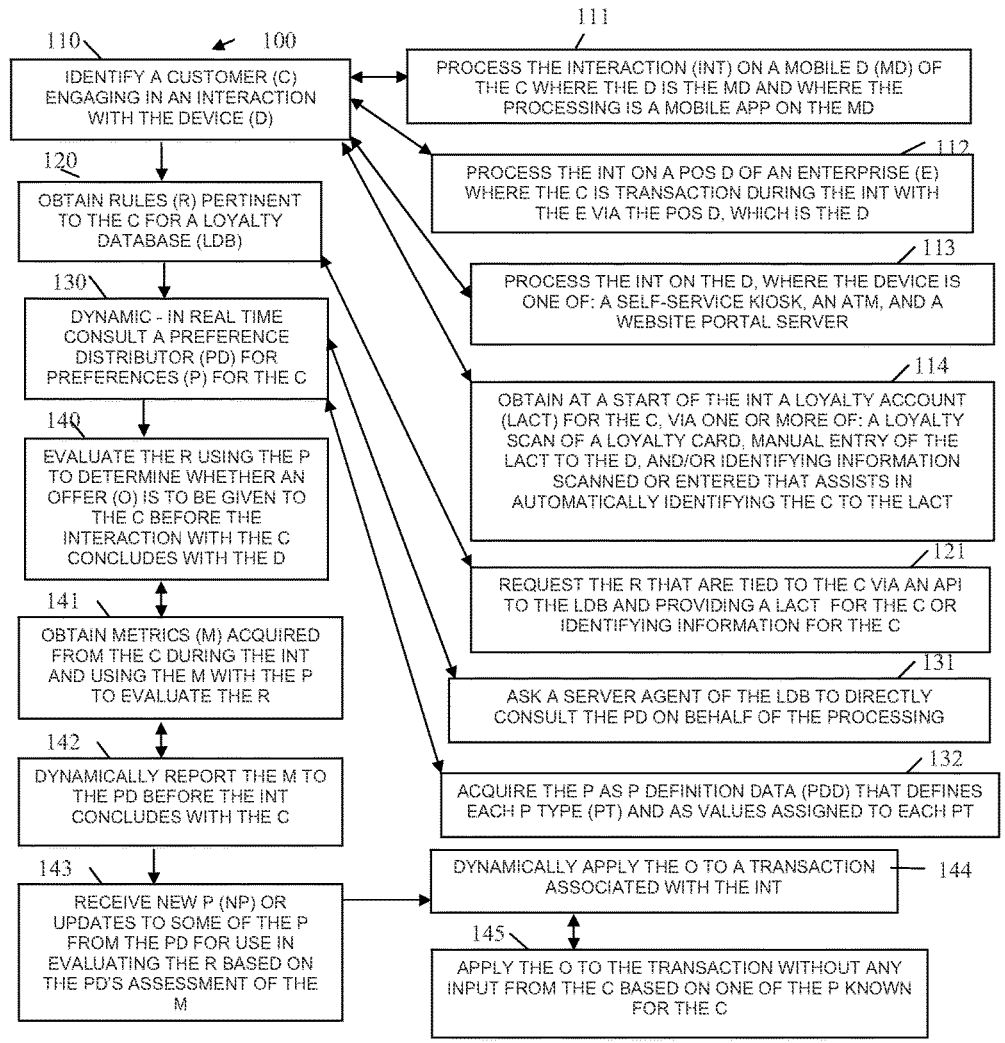
FIG. 1 is a diagram of method for real-time offer evaluation, according to an example embodiment.

FIG. 1 is a diagram of method 100 for real-time offer evaluation, according to an example embodiment. The method 100 (hereinafter "client loyalty offer agent") is implemented as instructions and programmed within a non-transitory computer-readable (processor-readable) storage medium that executes on one or more processors of a device (such as a mobile device, enterprise terminal device, and the like), the processors of the device are specifically configured to execute the client loyalty offer agent. The client loyalty offer agent may is also operational over a network; the network is wireless or a combination of wired and wireless. In an embodiment, the network is the Internet, a Wi-Fi network, a cellular network, a Bluetooth network, a satellite network, a closed and private Wide-Area Network (WAN), an Ethernet network, a Local-Area Network (LAN), other types of networks, or the network is a combination or all of these networks.

The processing of the client loyalty offer agent is presented from the perspective of an agent that processes as an application on a device that a consumer uses to transact with an enterprise.

As used herein the terms "consumer," "customer," and "user" may be used interchangeably and synonymously with one another.

At 110, the client loyalty offer agent identifies a customer engaging in an interaction with the device. The customer is interacting with the client loyalty offer agent to interface with an enterprise, such as during a checkout process with the enterprise. Although, the interaction itself need not necessarily be associated with a purchasing transaction for the enterprise. For example, the interaction may be related to making a reservation with the enterprise or taking a survey at the behest of the enterprise.

According to an embodiment, at 111, the client loyalty offer agent processes the interaction on a mobile device of the customer. Here, the device is the mobile device owned and operated by the customer. The client loyalty offer agent processes as a mobile app on the client's mobile device (e.g., phone, laptop, tablet, etc.).

In another situation, at 112, the client loyalty offer agent processes the interaction on a point-of-sale (POS) terminal device of the enterprise. Here, the interaction between the customer and the enterprise can occur via a POS terminal device being operated by the customer (such as a self-service kiosk) or a POS terminal device being operated by a cashier at the enterprise.

In yet another case, at 113, the client loyalty offer agent processes the interaction on the device where the device is one of: a self-service kiosk, an Automated Teller Machine (ATM), a website portal server of the enterprise, and the like.

It is also noted that the interaction may occur via the customer's mobile phone app interacting with the device that processes the client loyalty offer agent.

In an embodiment, at 114, the client loyalty offer agent obtains at a start of the interaction a loyalty account for the customer. This can be obtained in a variety of manners, such as one or more of: a loyalty scan of a customer's loyalty card, a manual entry of the loyalty account by the customer or personnel of the enterprise on behalf of the customer, and/or identifying information scanned or entered that assists in automatically identifying the customer of the loyalty account (for example, customer uses a credit card that identifies the customer during the interaction, this identifying information can be used to acquire the loyalty account of the customer).

At 120, the client loyalty offer agent obtains rules pertinent to the customer for a loyalty database. The rules are conditions arranged in a predefined order, which may or may not be dependent upon one another. The rules include values for defined variables; these values can be hardcoded or obtained from a variety of sources, such as from the device that the client loyalty offer agent processes on, the loyalty database, and/or a preference distributor (discussed below).

The rules are used to determine when and if an offer is to be made to a customer. The rules can thusly be customized for a particular customer, a particular customer segmentation type, a particular product or service, and customized for a combination of various enterprise-defined scenarios. An example rule, is in a format that the client loyalty offer agent can interpret and evaluate in real time and may include the following: "if customer x buys y and has a preference for something related to y, such as z, then offer x a free y with the purchase of a y." It is to be understood that this is but one example of a rule customized for product "y." Other situations can exist where the customization is based on the customer, a manufacture, or competitor to product y and the like.

In an embodiment, at 221, the client loyalty offer agent requests the rules that are tied to the customer via an Application Programming Interface (API) to the loyalty database by supplying a loyalty account for the customer or by providing identifying information for the customer that map in the loyalty database to the customer.

At 130, the client loyalty offer agent dynamically and in real time consults a preference distributor for preferences for the customer. That is, before the transaction concludes the client loyalty offer agent either directly consults the preference distributor or indirectly consults the preference distributor to acquire preferences for the customer. The preferences of the customer may be tied to a specific communication channel (in person, via web, via automated cell, via kiosk, and the like) and/or the preferences can be independent of any particular communication channel. These preferences captured and recorded in the EPM, such as the one discussed above and incorporated by reference herein.

In a scenario, at 131, the client loyalty offer agent asks a server agent of the loyalty database to directly consult the preference distributer on behalf of the client loyalty offer agent. This is an indirect scenario where integration occurs between the loyalty database and the EPM and agents of the loyalty database communicate with the client loyalty offer agent to ensure dynamic and real-time delivery of the preferences for the customer.

In a specific case, at 132, the client loyalty offer agent acquires the preferences as preference definition data that defines each preference type and as values that are assigned to each preference type. For example, a preference type may be payment preferred by the customer when using a cell phone to transact with the enterprise. Of course may others can exist as well and can be enterprise defined for the customer.

At 140, the client loyalty offer agent evaluates the rules using the preferences to determine whether an offer is to be given to the customer before the interaction with the customer concludes with the device. This is a real-time and dynamic processing scenario occurring while the customer is interacting with the enterprise via the device. The loyalty database details for the customer and the preferences of the customers are utilized in the rules that are dynamically evaluated to determine whether offers are to be given to the customer before the interaction concludes.

According to an embodiment, at 141, the client loyalty offer agent obtains metrics acquired from the customer during the interaction and uses the metrics with the preferences to evaluate the rules. So, as an example, suppose the customer purchases over 2 cans of corn of a certain brand during the interaction. The 2 cans of corn can be a dynamically acquired metric that when combined with a preference that the customer prefers Delmonte® from the preference data results in an offer for the customer to obtain a free can of corn from a competitor to Delmonte®.

Continuing with the embodiment of 141 and at 142, the client loyalty offer agent dynamically reports the metrics to the preference distributer before the interaction concludes (this in some cases can be after as well when there is no dynamic feedback being used).

Continuing with the embodiment of 142 and at 143, the client loyalty offer agent receives new preferences or updated preferences to some of the preferences from the preference distributor for use in re-evaluation of the rules based on the preference distributor's assessment of the metrics. So, values for particular preferences managed in the EPM and accessible to the preference distributor can be dynamically changed or added a new based on metrics during the interaction.

Still continuing with the embodiment of 143 and at 144, the client loyalty offer agent dynamically applies the offer to a transaction associated with the interaction. In one case, at 145, the client loyalty offer agent can apply the offer to the transaction without any input from the customer based on one of the preferences known for the customer. So, application of the offer can be driven by the customer or automatically driven based on existing preferences of the customer.

Figure 2:
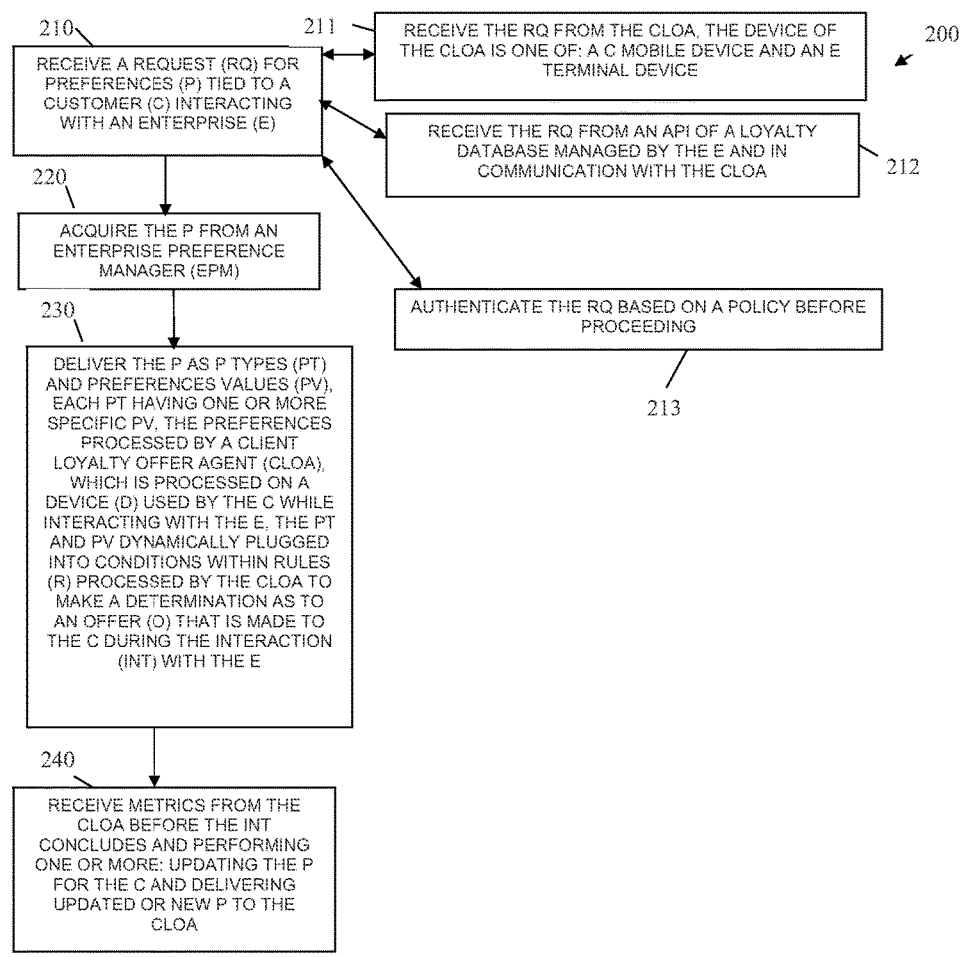
FIG. 2 is a diagram of another method for real-time offer evaluation, according to an example embodiment.

FIG. 2 is a diagram of another method 200 for real-time offer evaluation, according to an example embodiment. The method 200 (hereinafter "preference distributor") is implemented as instructions and programmed within a non-transitory computer-readable (processor-readable) storage medium that executes on one or more processors of a server (such as a cloud processing environment), the processors of the server are specifically configured to execute the preference distributor. The preference distributor is operational over a network; the network is wireless or a combination of wired and wireless. In an embodiment, the network is the Internet, a Wi-Fi network, a cellular network, WAN, LAN, Ethernet network, a Bluetooth network, other types of networks, a satellite network, or the network is a combination or all of these networks.

In an embodiment, the preference distributor describes processing actions from the perspective of a specific server that is interacting with the client loyalty offer agent described above with reference to the FIG. 1. So, in an embodiment, the preference distributor interacts with the client loyalty offer agent represented by the method 100 of the FIG. 1 and discussed in detail above.

In an embodiment, the preference distributor is an enhancement to an EPM, such as the EPM discussed above and incorporated by reference herein.

In another case, the preference distributor is an enhancement to a server-based loyalty system of an enterprise that interacts with the EPM and then communicates preference definitions and values to the client loyalty offer agent.

At 210, the preference distributor receives a request for preferences tied to a customer interacting with an enterprise.

In an embodiment, at 211, the preference distributor receives the request from the client loyalty offer agent, such as the client loyalty offer agent discussed above with reference to the FIG. 1. The device of the client loyalty offer agent is one of: a customer's mobile device and an enterprise's terminal device.

In another scenario, at 212, the preference distributor receives the request from an API of a loyalty database managed by the enterprise and in communication with the client loyalty offer agent. So, the preference distributor may directly or indirectly (via the loyalty database) interact with the client loyalty offer agent.

In some situations, at 213, the preference distributor may also authenticate the request, enterprise, and/or customer based on dynamic policy evaluation before the interaction with the preference distributor proceeds.

At 220, the preference distributor acquires the preferences from an EPM. This was discussed above, preference values for a variety of custom-defined preference types are centrally gathered for the customer across a plurality of disparate communication channels for the enterprise. These preferences are obtained from the EPM.

At 230, the preference distributor delivers the preferences as preference types and preference values. Each preference type having one or more specific preference values. The preferences are processed by a client loyalty offer agent (such as the client loyalty offer agent discussed within the context of the FIG. 1). The client loyalty offer agent being processed on a device used by the customer while the customer interacts with the enterprise. The preference types and preference values are dynamically plugged into conditions within rules processed by the client loyalty offer agent to make a real-time determination as to an offer that is made to the customer during the interaction with the enterprise. This processing situation was discussed above with reference to the FIG. 1.

According to an embodiment, at 240, the preference distributor receives metrics from the client loyalty offer agent before the interaction concludes and performs one or more of: updating the preferences for the customer and/or delivering updated and/or new preferences to the client loyalty offer agent. So, the loyalty processing of an enterprise can be integrated with the EPM in real time to deliver a dynamic feedback loop during an interaction between the enterprise and a customer.

Figure 3:
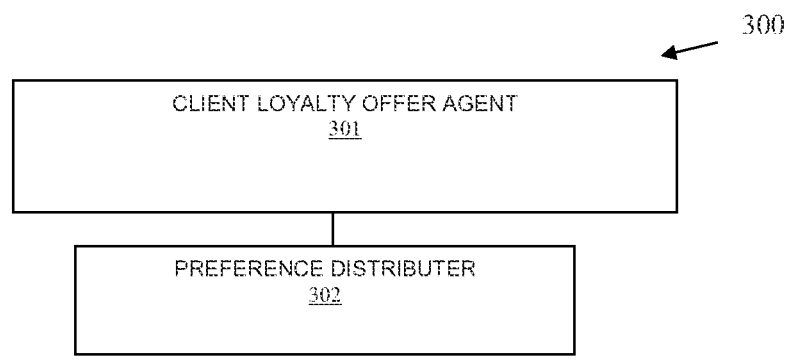
FIG. 3 is a diagram of a real-time offer evaluation system, according to an example embodiment.

FIG. 3 is a diagram of a real-time offer evaluation system 300, according to an example embodiment. The evaluation system 300 includes one or more processors that are specifically configured to perform, inter alia, the processing associated with the methods 100 and 200 of the FIGS. 1 and 2, respectively. Furthermore, the evaluation system 300 is operational over a network and the network can be wireless or a combination of wired and wireless. In an embodiment, the network is the Internet. In another case, the network is a cellular network. In yet another situation, the network is a satellite network. In still another case, the network is a Wi-Fi network, Bluetooth network, WAN, LAN, Ethernet network, or other type of network. It may also be that the network uses all or a combination of: the Internet, cellular network, Bluetooth network, Wi-Fi network, other type of network, and/or satellite network.

The evaluation system 300 includes a client loyalty offer agent 301 and a preference distributer 302. Each of these and their interactions with one another will now be discussed in turn.

The client loyalty offer agent 301 is implemented, programmed, and resides within a non-transitory processor-readable storage medium and executes on a client device (first machine). Example processing associated with the client loyalty offer agent 301 was presented above in detail with respect to the FIG. 1.

The client loyalty offer agent 301 is configured to interact with the preference distributer 302 to acquire preferences for a customer. The customer is dynamically interacting with an enterprise, via the first machine. The client loyalty offer agent 301 further configured to acquire rules for the customer from a loyalty database and use the preferences in evaluating the rules to determine whether to make an offer to the customer before the interaction between the enterprise and the customer concludes.

The preference distributer 302 processes on a physical server machine or a Virtual Machine (VM) (second machine) and is operational over a network. That is, the preference distributer 302 is implemented, resides, and programmed within a non-transitory processor-readable medium as executable instructions that a processor-enabled device executes. In some cases, the preference distributer 302 is accessible via one or more cloud processing environments. Example processing associated with the preference distributer 302 was presented above with reference to the FIG. 2.

The preference distributer 302 is configured to provide the preferences in real time to the client loyalty offer agent 301 and configured to receive feedback information from the client loyalty offer agent 301 to update the preferences and/or provided new or revised preferences to the client loyalty offer agent 301 before the interaction concludes.

According to an embodiment, the first machine is a mobile device of the customer and the second machine is a cloud processing environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on a device, which is configured to execute the method, comprising:

identifying, by the device, a customer engaging in an interaction with the device;

obtaining, by the device, rules pertinent to the customer for a loyalty database, wherein obtaining further includes obtaining the rules as customized conditions arranged in a predefined order for the customer and particular products or services available to dynamically offer to the customer, wherein obtaining further includes identifying with the customized conditions defined variables and obtaining values for the variables from a combination of: the device, the loyalty database, and a preference distributer;

dynamically and in real time consulting, by the device, the preference distributor for preferences associated with the customer, the preferences are communication channel specific based on a communication channel for which the customer is being engaged in the interaction, wherein the preference distributor executes on a server and delivers the preferences to the device through an Application Programming Interface (API) over the particular communication channel, and the communication channel is processed for providing an offer to the customer during the interaction, and some of the preferences are associated with specific communications made to the customer over a particular communication channel and others of the preferences for other communications made to the customer that are independent of any particular communication channel, and the communication channel includes a kiosk communication channel; and evaluating, by the device, the rules using the preferences to determine whether the offer is to be given to the customer before the customer concludes a transaction with the device.

2. The method of claim 1, wherein identifying further includes processing the interaction on a point-of-sale (POS) device of an enterprise, wherein the POS device is the device.

3. The method of claim 1, wherein identifying further includes processing the interaction on the device, and wherein the device is one of:

a self-service kiosk and an Automated Teller Machine (ATM).

4. The method of claim 1, wherein identifying further includes obtaining at a start of the interaction a loyalty account for the customer, via one or more of:

a loyalty scan of a loyalty card, manual entry of the loyalty account to the device, and/or identifying information scanned or entered that assists in automatically identifying the customer to the loyalty account.

5. The method of claim 1, wherein obtaining further includes requesting the rules that are tied to the customer via the Application Programming Interface (API) to the loyalty database and providing a loyalty account for the customer or identifying information for the customer.

6. The method of claim 1, wherein dynamically and in real time consulting further includes asking a server agent of the loyalty database to directly consult the preference distributer on behalf of the method.

7. The method of claim 1, wherein dynamically and in real time consulting further includes acquiring the preferences as preference definition data that defines each preference type and as values assigned to each preference type.

8. The method of claim 1, wherein evaluating further includes obtaining metrics acquired from the customer during the interaction and using the metrics with the preferences to evaluate the rules.

9. The method of claim 8, wherein evaluating further includes dynamically reporting the metrics to the preference distributer before the interaction concludes with the customer.

10. The method of claim 9 further comprising, receiving new preferences or updates to some of the preferences from the preference distributer for use in evaluating the rules based on the preference distributor's assessment of the metrics.

11. The method of claim 10 further comprising, dynamically applying the offer to the transaction associated with the interaction.

12. The method of claim 11, wherein dynamically applying further includes applying the offer to the transaction without any input from the customer based on one of the preferences known for the customer.

13. A system, comprising:
a first machine having a client loyalty offer agent implemented in a non-transitory computer-readable storage medium and which processes on the first machine; and
a second machine having a preference distributer implemented in a non-transitory computer-readable storage medium and which processes on the second machine;
the client loyalty offer agent configured to interact with the preference distributer to acquire preferences for a customer, the preferences associated with a communication channel for which an offer is to be given to the customer and some of the preferences are associated with specific communications made to the customer over a particular communication channel and others of the preferences for other communications made to the customer that are independent of any particular communication channel, and the communication channel is a kiosk communication channel, and the customer dynamically interacting with an enterprise via the first machine, the client loyalty offer agent further configured to acquire rules for the customer from a loyalty database and process the preferences in evaluating the rules to determine whether to make the offer to the customer before a transaction between the enterprise and the customer concludes, where the rules are customized conditions arranged in a predefined order for the customer and particular products or services available to dynamically offer to the customer, and wherein the customized conditions include variables and values for the variables obtained from: the first machine, the loyalty database, and the preference distributer, and wherein the preference distributer configured to provide the preferences in real time to the client loyalty offer agent and configured to receive feedback information from the client loyalty offer agent to update the preferences and/or provided new or revised preferences to the client loyalty offer agent before the interaction concludes.

14. The system of claim 13, wherein the first machine is a mobile phone of the customer and the second machine is located in a cloud processing environment.

* * * * *